Aug. 3, 1954  R. C. DREIER  2,685,301
LIQUID INLET CONTROL ASSEMBLY
Filed Nov. 16, 1950
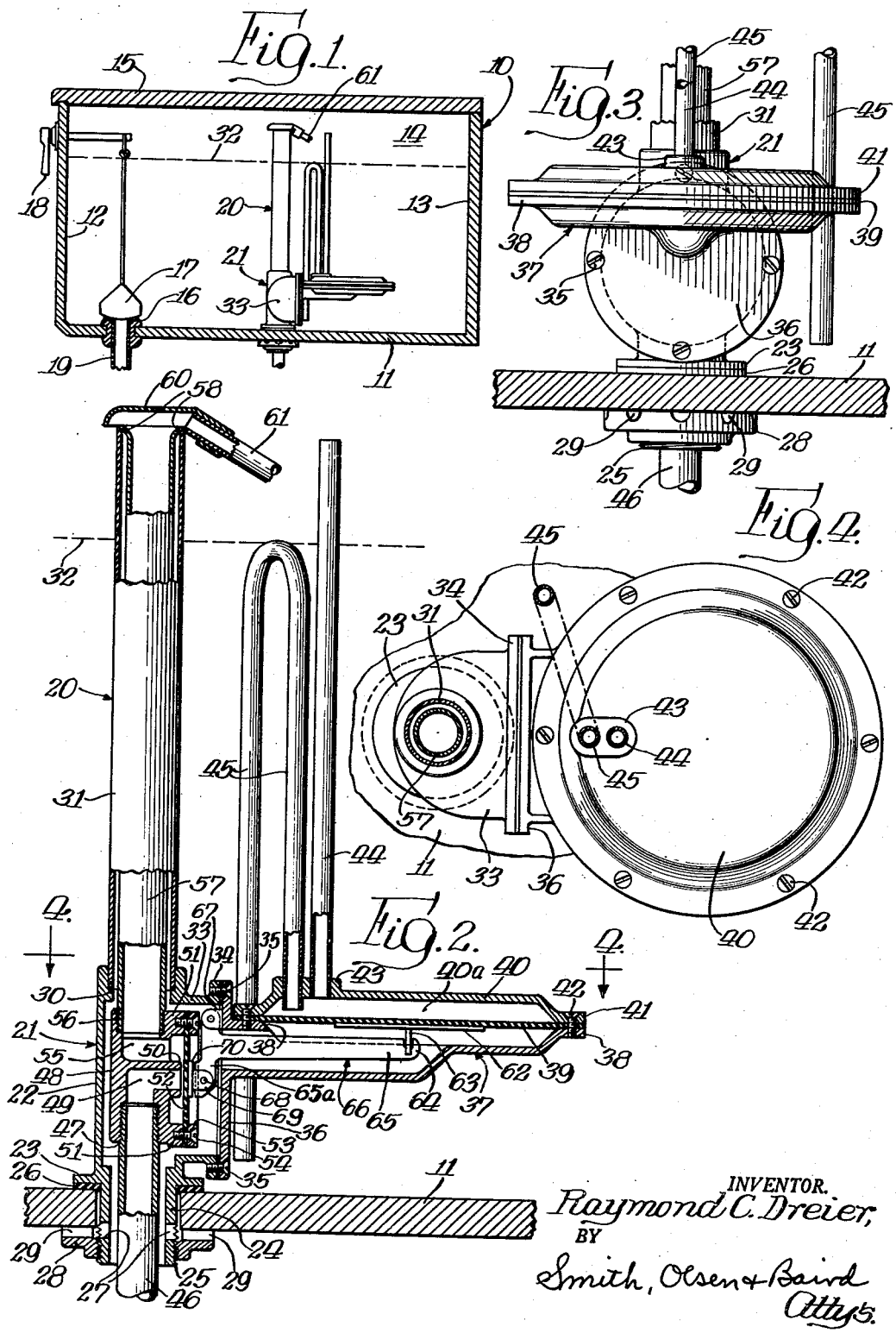
INVENTOR.
Raymond C. Dreier,
BY
Smith, Olsen & Baird
Attys.

Patented Aug. 3, 1954

2,685,301

UNITED STATES PATENT OFFICE 2,685,301

LIQUID INLET CONTROL ASSEMBLY

Raymond C. Dreier, Shawano, Wis., assignor, by mesne assignments, to Dreier Brothers, Inc., Chicago, Ill., a corporation of Illinois Application November 16, 1950, Serial No. 196,073

8 Claims. (Cl. 137—386)

The present invention relates to means for controlling liquid flow into a tank or vessel, and more particularly to an improved inlet control assembly of a type adapted for automatically controlling the refilling of a tank to a predetermined maximum liquid level after the liquid level in the tank has been reduced to a minimum level. The inlet control assembly of the present invention finds its most important use in conjunction with tank installations in which it is important that liquid which has once entered the tank shall not be permitted to seep or leak back into the liquid inlet conduit and become intermixed with the primary liquid supply.

A tank installation of the kind referred to above is typified by the tank arrangement in an ordinary flush-type toilet. Ordinarily the water supplied to a toilet tank is furnished from the same source that supplies drinking water and water for other uses about the house or building. Because the water in the toilet tank often stands for considerable periods before being used and because the water in the tank may be subject to contamination, it is extremely important that precautions be taken in the construction of the tank and its water inlet facilities to insure that none of the liquid in the tank can find its way back into the inlet pipes or conduits leading into the tank. This problem is complicated to a certain extent by the fact that in nearly all modern tanks for flush-type toilets, for the sake of appearance if for no other reason, the inlet conduit for conducting water into the tank enters through the bottom of the tank and well below the normal liquid level in the tank. Heretofore, in most such toilet installations, the inlet conduit has been extended upwardly inside the tank to a position above the maximum liquid level and has been topped with a float operated valve. In such installations the body of the valve and the inlet opening for the liquid have ordinarily been disposed above the maximum liquid level in the tank in order to reduce the possibility that water from within the tank may re-enter the conduit through the inlet opening or through the inlet valve assembly itself. This precautionary arrangement, however, has not given complete protection against contamination of the water source, for the possibility has remained that water inside the tank can seep back into the upstanding conduit in the tank through imperfect joints in the conduit or through the walls of the conduit when the conduit becomes old and rusted. This possibility has been particularly prevalent in connection with toilet installations on the upper floors of houses or buildings, for when the pressure from the water source is cut off for one reason or another and a water tap on one of the lower floors is opened, the water in the pipes serving the upper floors will drain downwardly in the piping system toward the open tap. Inasmuch as the inlet valves in all of the toilet tanks on the upper floors will normally be closed, the falling water level in the piping system will create a negative pressure condition at each of the toilet tank inlet valves on the upper floors. As a result, if any one of the upstanding inlet conduits in any of these toilet tanks has the slightest perforation or crack in its walls, water from the interior of the toilet tank will be drawn into the inlet conduit and will pass downwardly into the pipes on the lower floors. Contamination of the entire piping system in the house or building may result.

Serious difficulties can also arise in this connection when siphon-type inlet control valves are used in toilet tanks or other tanks where the problem of contamination exists. Such valves are much to be preferred over float-type control valves in many installations because their movement from full closed to full open position, and from full open to full closed position, may be brought about very quickly. The use of a siphon-type inlet control valve in a toilet tank, for example, will eliminate the noise or "chatter" that normally occurs in a float controlled valve while the float-type valve is slowly moved to its full closed position in response to the rising water level in the tank. However, when a siphon-type inlet control valve is employed in a tank, some part or all of the valve control assembly must be disposed below the maximum liquid level within the tank. This disposition of the valve control assembly obviously greatly increases the possibility of contamination of the primary liquid supply, for the water or other liquid in the interior of the tank may seep back into the inlet piping system through some part of the valve control assembly as well as through possible perforations in the walls of the upstanding inlet conduit in the tank.

One of the important objects of the present invention is to provide an inlet control assembly for a tank for liquids wherein all parts of a liquid inlet conduit disposed within the tank below the maximum liquid level are isolated from the contents of the tank by an air space, thus avoiding the possibility of contamination of the source of liquid supply by reason of leakage of liquid from the interior of the tank through the walls of the conduit.

Another object of the present invention is to provide an inlet control assembly of the aforesaid character wherein a valve assembly is employed in the conduit below the maximum liquid level in the tank and is located within the isolating air space.

A further object of the invention is to provide an inlet control assembly of the kind stated above, embodying siphon operated means for operating the valve responsive to maximum and minimum liquid levels in the tank.

Still another object of the invention is to provide an inlet control assembly for a tank for liquid, having an inlet conduit and a valve disposed in the tank below a maximum liquid level therein and enclosed in a liquid-tight casing, one wall of the casing being flexible and being movable by siphon operated means for operating the valve.

These and other objects of the present invention will be apparent from the following description of a preferred embodiment thereof, taken in connection with the accompanying drawing in which:

Fig. 1 is an elevational view, in cross-section, taken through a water tank for a flush-type toilet, showing installed therein an inlet control assembly embodying the present invention;

Fig. 2 is an elevational view, partly in cross-section, showing details of the construction of the inlet control assembly illustrated in Fig. 1;

Fig. 3 is a fragmentary elevational view of the inlet control assembly as viewed from the right of Fig. 2; and Fig. 4 is a plan view of the control assembly, partly in cross-section, taken on the line 4—4 in Fig. 2.

In the drawing the numeral 10 designates a tank of the type generally used in conjunction with flush-type toilets. The tank comprises a bottom 11, end walls 12 and 13, a back wall 14, a top 15, and a front wall not shown. In the bottom 11 of the tank is a valve seat 16 adapted to receive the usual outlet ball valve 17 which may be lifted from the seat by movement of an external handle 18 to cause egress of water from the tank through a pipe 19 leading to a toilet bowl (not shown). The discharge of water through the pipe 19 may serve to flush the toilet bowl in the usual manner.

The inlet control assembly of the present invention is generally designated by the numeral 20 in Fig. 1 where the assembly is shown mounted in an upright position on the bottom 11 of the tank. The lower portion of the control assembly comprises a generally cylindrical, hollow base member 21 of metal, plastic or the like, having an upright cylindrical wall 22. (See Fig. 2.) Formed upon the lower end of the cylindrical wall 22 is a circular flange 23 and a depending pipe-like portion 24 which extends downwardly through a suitable opening provided in the bottom 11 of the tank. The lower-most end of the pipe-like portion 24 protrudes from the bottom of the tank and is threaded as at 25. The lower side of the flange 23 rests upon the inner surface of the bottom 11 of the tank, with a circular gasket 26 interposed therebetween, and the protruding threaded end of the pipe-like portion 24, which is provided with a plurality of radial openings 27, is adapted to receive a nut 28 having a plurality of radial slots 29 in its body opposing the openings 27. The nut 28 when threaded upon the protruding end of the pipe-like portion 24, as seen in Fig. 2, is brought to bear upon the outer surface of the bottom 11 of the tank and thus draws the circular flange 23 tightly down against the gasket 26 to perfect a liquid tight seal around the opening in the bottom of the tank. The uppermost end of the generally cylindrical, hollow base member 21 is recessed as at 30 to receive in a water-tight joint the lowermost end of a cylindrical, upstanding casing 31 which extends upwardly to a position well above a predetermined maximum liquid level 32 in the tank.

Integral with the base member 21 and extending outwardly therefrom, about a horizontal axis at right angles to the main vertical axis of the base member 21 is a generally cylindrical portion 33, which has formed on its outer end a circular flange 34. Secured to this flange 34, as by screws 35, is a vertically disposed circular plate-like flange 36 which is formed on one end of a concave, dish-shaped, generally circular casting designated by the reference numeral 37. The casting 37 is provided with a circular peripheral flange 38 which lies in a horizontal plane and is overlaid by a circular flexible diaphragm 39. Over this diaphragm 39 is a circular cap 40 of an inverted dish-shape having a circular peripheral flange 41 which mates with the circular flange 38. The two flanges are secured together, with the peripheral edge of the diaphragm 39 tightly clamped therebetween, by a plurality of screws 42 which extend downwardly through suitable openings in the flange 41, through the dege portion of the diaphragm 39, and are threaded into the flange 38.

A raised boss 43 is provided on the upper surface of the cap 40 and two openings are provided therein for receiving the lower-most end of a vent tube 44 and one end of an inverted U-shaped siphon tube 45. Both the vent tube and the siphon tube are soldered or otherwise tightly secured in the openings in the boss 43. The vent tube 44 extends upwardly in the interior of the tank to a position well above the maximum liquid level 32 in the tank and serves to vent a pressure chamber 40a which is defined by the interior surface of the inverted, dish-shaped, circular cap 40 and the upper surface of the flexible diaphragm 39. From the interior of the pressure chamber 40a one leg of the U-shaped siphon tube 45 extends upwardly through the boss 43 to the maximum liquid level 32 in the tank and thence downwardly to a level adjacent the bottom 11 of the tank.

An inlet pipe 46, connected to a source of water supply (not shown) and adapted to carry water to the tank, extends upwardly into the interior of the base member 21 of the control assembly through the axial opening in the depending pipe-like portion 24 of the base member 21. The upper end of the pipe 46 is provided with external threads, as at 47, which are engaged by an internally threaded lower opening in a valve body 48. The valve body 48 is provided with an inlet passage 49 which extends upwardly from the uppermost end of the pipe 46 and then turns at a right angle horizontally and terminates at a circular, raised valve seat 50 lying in a vertical plane on an outside face of the valve body. This face on the valve body is provided with a raised, circular, flange 51 which extends outwardly slightly beyond the plane of the valve seat 50. The flange 51 is adapted to receive a circular, flexible diaphragm 52 which is secured to the flange by a mounting ring 53 attached to the flange by means of a plurality of countersunk screws 54 which pass through suitable openings provided in the ring and in the peripheral area of the diaphragm 52, and are threaded into the circular raised flange 51.

The face of the valve body 48, the raised valve seat 50, the inner surface of the flange 51, and the diaphragm 52, define a ring-shaped water passage around the outside of the valve seat from which an outlet passage 55 extends to the top of the valve body. This outlet passage 55 extends horizontally in the valve body from the ring-shaped water passage and then turns upwardly at right angles to terminate in an opening in the upper side of the valve body. The opening is internally threaded as at 56 and receives the lowermost end of an externally threaded pipe 57 which extends upwardly from the valve body, through the interior of the casing 31, to the uppermost end of the casing where the walls of the pipe 57 are flared outwardly, as at 58, and are preferably welded to the internal surface or to the upper end of the casing 31. A cap 60 may be applied above the upper end of the casing 31 by means of brackets or the like (not shown), and from the side of the cap a pipe or tube 61 may extend downwardly to communicate with the toilet trap, if desired.

A disc 62 is secured in any suitable manner, as by cement or the like, to the center of the under-side of the flexible diaphragm 39. Extending downwardly from the center of the disc 62 is a forked projection 63 which engages a notched end portion 64 of an arm 65 of a valve operating member designated generally by the reference numeral 66. A boss 67 is formed on the inner face of the plate 36 and pivotally supports the valve operating member 66 at the left end of the arm 65, as viewed in Fig. 2. The valve operating member 66 is provided with a second arm 65a which extends downwardly from the left end of the arm 65. On the lower extremity of the arm 65a is pivotally mounted, as by a pin 68, a forked projection 69 formed on one side of a disc 70. The other side of the disc 70 is secured to the center of the circular diaphragm 52 opposite the valve seat 50, as by cement or the like.

In operation, all water entering the tank 10 must pass through the inlet control assembly described above. Assuming for the moment that the tank 10 is empty, water under pressure from the city mains or from some other primary water source will pass upwardly under pressure through the inlet pipe 46 and into the inlet passage 49 in the body 48 of the valve. The pressure of the incoming water, which will usually be in the neighborhood of 60 pounds per square inch if water from city mains is used, will push the flexible diaphragm 52 off the valve seat 50 and the water will flow into and completely fill the circular water passage around the valve seat 50. From this circular passage the water will flow out of the valve unit through the outlet passage 55 and will rise in the pipe 57 to its top where it will spill over into the interior of the tank 10. Some of the water will also spill into the tube 61 and will be led to the toilet to fill the toilet trap.

As the water rises in the interior of the tank 10, the water will enter the lower-most open end of the inverted U-shaped siphon tube 45 and will rise therein at the same rate it rises in the tank. When the water in the tank reaches the predetermined maximum liquid level 32, the rising water in the siphon tube 45 will flow over the top of the inverted "U" and will flow downwardly through the other leg of the tube into the pressure chamber 40a. This pressure chamber 40a will be quickly filled with water and the air previously contained therein will be expelled through the vent tube 44. As soon as the water has completely filled the pressure chamber 40a and has risen in the vent tube 44, the liquid pressure head provided by the column of water in the siphon tube 45 will flex the diaphragm 39 downwardly. This movement of the diaphragm 39 forcibly pivots the valve operating member 66 in a clockwise direction as seen in Fig. 2, causing the disc 70 secured to the arm 65a to force the flexible diaphragm 52 onto the valve seat 50 to stop the flow of water into the tank.

The internal volume of the pressure chamber 40a and the internal diameters of the siphon tube 45 and the vent tube 44 are relatively small so that as soon as the water level in the tank has reached the predetermined maximum level 32, the interior of the pressure chamber 40a will be very quickly filled and the pressure head on the diaphragm 39 will be quickly established. In this way it will be understood that the closing action of the valve, as just described, will take place very quickly, and the valve will thus be moved substantially instantaneously from its full open position to its full closed position.

When the handle 18 on the exterior of the tank 10 is operated to lift the ball valve 17 from the seat 16, the water in the tank will be discharged therefrom rapidly through the large outlet pipe 19 to provide the flushing action in the toilet in the usual manner. As soon as the liquid level in the tank has fallen to a point below the lower-most end of the siphon tube 45, the tube 45 will immediately begin to siphon water out of the pressure chamber 40a. This will quickly lower the water standing in the vent tube 44. When the water level in the pressure chamber 40a is reduced sufficiently to expose the end of the siphon tube 45, which extends downwardly into the chamber, the siphon action will immediately be broken and the pressure head on the diaphragm 39 will be relieved at once, thus permitting the water pressure in the inlet pipe 46 and inlet passage 49 of the valve body immediately to lift the diaphragm 52 from the seat 50 and again permit the inflow of water to fill the tank 10. When the tank 10 is again filled, the above described action will be repeated to shut off the inflow of water.

Now it will be seen that the upstanding casing 31, the base member 21, the dish-shaped casting 37 with its plate 36, and the flexible diaphragm 39, together comprise in effect a liquid tight casing completely enclosing the liquid inlet conduit system in the inlet control assembly of the present invention. This casing is hollow and is open to the atmosphere below the tank 10 through the space existing between the outer surface of the inlet pipe 46 and the internal surface of the downwardly extending pipe-like portion 24 of the base member 21. The casing is thus filled with air and serves to isolate the inlet conduit system and the valve therein from the liquid contents of the tank. Any leak that might occur at any place in this casing will not subject any part of the inlet conduit system to the hazard of contamination, for any water that may seep or leak into the interior of the casing will immediately drain to the lower interior thereof and will flow downwardly and out of the casing through the drain passage provided by the space between the inlet pipe 46 and the interior of the depending pipe-like portion 24 of the base member 21. Thus any water that may leak or seep into the casing will immediately be discharged to the area beneath the tank 10 where its presence will give notice that a leak has occurred. Proper action to replace the inlet control assembly or to repair the same can then be taken. The openings 29 in the nut 28 and the opposed openings 27 in the depending pipe-like portion 24 of the base member 21 are provided to insure proper drainage from the interior of the casing even though the space between the outside of the inlet pipe 46 and the interior of the pipe-like portion 24 is inadvertently sealed by paint or the like.

The foregoing description has been given for clearness of understanding only, and no unnecessary limitations should be inferred therefrom, for it will be apparent to those skilled in the art that various changes may be made in the construction shown and in the application of the invention without departing from the spirit and scope of the appended claims.

I claim:

1. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, and means including a flexible wall in said casing for operating said valve.

2. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, and means responsive only to maximum and minimum liquid levels in said tank for operating said valve.

3. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, a flexible wall in said casing, and means interconnecting said valve and said wall responsive to movement of said wall for opening and closing said valve.

4. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, a flexible wall in said casing, means responsive to maximum and minimum liquid levels in said tank for flexing said wall, and means responsive to said flexing of said wall for opening and closing said valve.

5. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, a flexible wall in said casing, siphon means responsive to maximum and minimum liquid levels in said tank for applying and removing liquid pressure on one side of said wall for flexing said wall, and means responsive to said flexing of said wall for opening and closing said valve.

6. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, a horizontal flexible diaphragm comprising one wall of said casing, siphon means responsive to maximum and minimum liquid levels in said tank for applying to and removing liquid pressure from one side of said diaphragm to flex the same, and means responsive to said flexing of said diaphragm for opening and closing said valve.

7. In a tank for liquid, an inlet control assembly comprising, an inlet conduit extending into said tank, a valve in said conduit within said tank below a maximum liquid level therein, a hollow, liquid-tight casing enclosing the exterior of said valve and providing an air space thereabout for isolating said valve from the liquid contained in said tank, a horizontal flexible diaphragm comprising one wall of said casing, a pressure chamber on the outer side of said diaphragm, a siphon tube extending upwardly from the interior of said tank to said maximum liquid level and then downwardly into said pressure chamber, said siphon tube receiving liquid pressure head from said liquid in said tank and applying said head to said outer side of said diaphragm in said pressure chamber to displace said diaphragm from a normal position when the liquid in said tank is at said maximum liquid level and removing said head and thereby permitting said diaphragm to return to said normal position when said liquid in said tank drops to a minimum level, and means responsive to said movement of said diaphragm for opening and closing said valve.

8. In a tank for liquid, an inlet control assembly comprising, an inlet conduit extending upwardly within said tank and having a discharge opening disposed above a maximum liquid level in said tank, a valve in said conduit within said tank below said maximum liquid level, a hollow, liquid-tight casing enclosing the exterior of said valve and all portions of said conduit below said maximum liquid level for isolating said valve and conduit from said liquid, and siphon operated means on the exterior of said casing and extending into said casing responsive to maximum and minimum liquid levels in said tank, said siphon operated means being operatively connected to said valve for opening and closing the same.

References Cited in the file of this patent

UNITED STATES PATENTS

| Number | Name | Date |
|---|---|---|
| 1,338,179 | Hohmeister | Apr. 27, 1920 |
| 1,787,130 | Turner | Dec. 30, 1930 |
| 2,111,614 | Cox | Mar. 22, 1938 |
| 2,195,797 | Groeniger | Apr. 2, 1940 |
| 2,442,927 | Horvath | June 8, 1948 |